United States Patent [19]

Paarmann

[11] Patent Number: 4,476,645
[45] Date of Patent: Oct. 16, 1984

[54] FISHING POLE HOLDER

[76] Inventor: James Paarmann, R.R. 4, Box 2, Girard, Kans. 66743

[21] Appl. No.: 434,954

[22] Filed: Oct. 18, 1982

[51] Int. Cl.³ .............................................. A01K 97/12
[52] U.S. Cl. ........................................... 43/15; 43/16
[58] Field of Search ...................................... 43/15, 16

[56] References Cited

U.S. PATENT DOCUMENTS 2,770,906 11/1956 Hood ........................................ 43/16
2,944,361 7/1960 Coulter .................................... 43/16
3,154,875 11/1964 Biddison .................................. 43/15

Primary Examiner—Nicholas P. Godici
Assistant Examiner—Kurt Rowan
Attorney, Agent, or Firm—Kokjer, Kircher, Bradley, Wharton, Bowman & Johnson

[57] ABSTRACT

A fishing rod holder having an improved latch release mechanism is the subject of the present invention. A stake is insertable into the ground and mounts a rigid bracket which in turn mounts two pivotal arms. A socket which receives the end of a fishing rod is mounted on the pivotal arms and is held in place by a latch which is likewise pivotal. A camming mechanism is mounted on the socket so that any downward movement of the socket will result in an upward camming movement of the camming means which releases the latching mechanism. A first spring means biases the latch into engagement with a latch plate and is adjustable for rods of different weight and different fish. A second yieldable means is provided for biasing the socket upwardly after the latch disengages the latch plate.

7 Claims, 4 Drawing Figures

U.S. Patent  Oct. 16, 1984  4,476,645
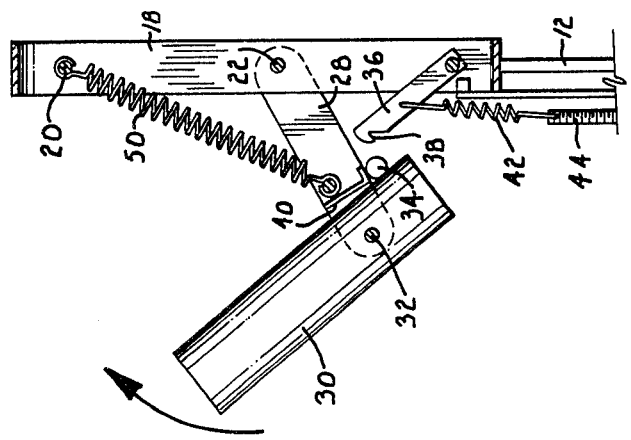
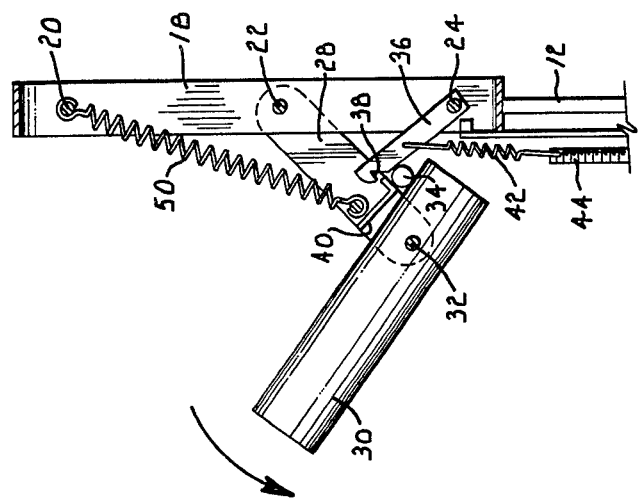
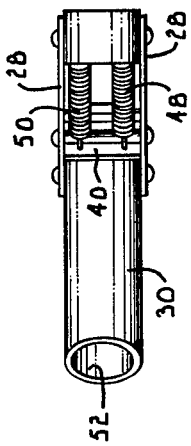
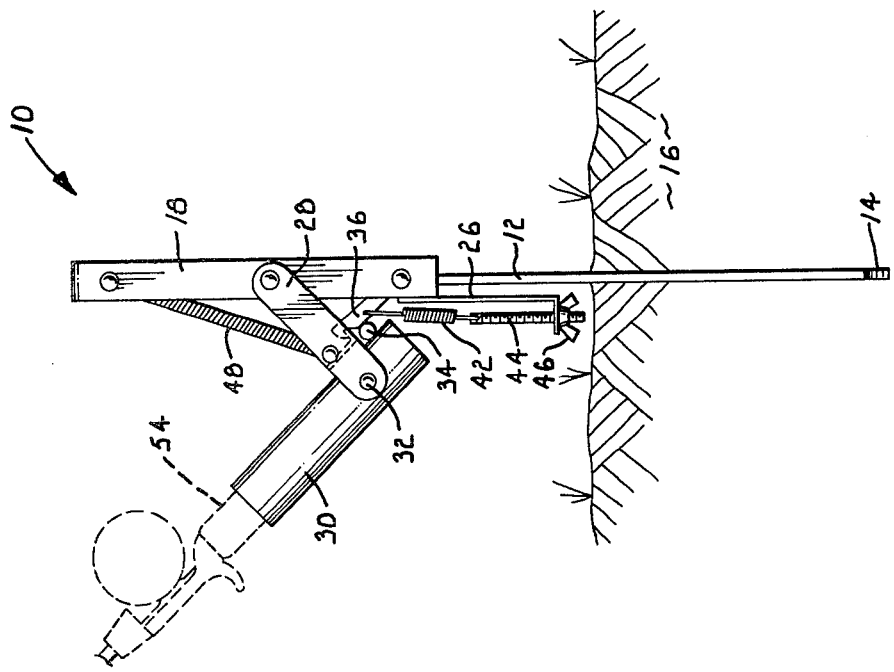

FISHING POLE HOLDER

BACKGROUND AND OBJECTS OF THE INVENTION

This invention relates generally to fishing equipment and, more particularly, to a fishing rod holder having an improved actuating mechanism for automatically setting a fish hook.

Many fishing rod holders have been proposed and produced over the years. Most of these devices employ some type of spring mechanism so that, when a fish bites, the holder will react under spring tension to raise the fishing rod and set the hook.

Typical examples of the prior art devices are found in U.S. Pat. Nos. 3,284,943; 3,407,527; 3,722,127; and 3,881,269. In some instances, the prior art devices continue to exert a pulling force on the fishing line after the hook has been set. This increases the possibility of the line breaking. In all of the known prior art devices, as exemplified by the patents identified above, the latch which maintains the rod holder in position before a fish bites releases in direct response to the downward pulling action of the fish. This may cause the release action to be less than smooth and in some cases a fish may actually be able to steal the bait off of the hook without triggering the mechanism which sets the hook.

It is, therefore, a primary object of the present invention to provide a fishing rod holder which automatically sets the fishing hook in response to a fish biting wherein the tension on the rod is released after the hook is set.

A very important aim of my invention is to provide a fishing rod holder having a mechanism to automatically set the hook in response to a fish biting wherein a positive camming action is provided to release the latching mechanism thereby not depending upon casual disengagement of the latch to activate the tensioning mechanism.

As a corollary to the above aim, an objective of the invention is to provide a release mechanism of the type described which pushes upwardly to positively disengage the latching mechanism and is not therefore solely dependent for release upon downward pulling of the rod being held.

Other objects of the invention will be made clear or become apparent from the following description and claims when read in light of the accompanying drawing, wherein:

FIG. 1 is a side elevational view of the fishing rod holder of the present invention placed in the ground;

FIG. 2 is a vertical cross-sectional view illustrating how the rod holder positive release mechanism is activated;

FIG. 3 is a top plan view looking down on the latching mechanism of FIG. 2; and

FIG. 4 is another vertical cross-sectional view illustrating the movement of the rod holder after release of the latching mechanism.

DETAILED DESCRIPTION OF THE INVENTION

Referring initially to FIG. 1, the fishing rod holder of the present invention is designated generally by the numeral 10 and comprises an elongated vertical stake 12 having a pointed end 14 for insertion into the ground 16. A generally U-shaped bracket 18 is rigid with stake 12 and mounts three rigid cross ties 20 through 24 which extend between the legs of the bracket. Bracket 18 also mounts an L-shaped foot 26 which extends downwardly in the direction of stake 12.

Arms 28 are pivotally coupled with bracket 18 through cross tie 22 and serve to mount an elongated open ended socket member 30 through a pin connection 32. Socket 30 is free to rotate about pin connection 32. Socket 30 also mounts a camming rib 34 which is rigid with the socket.

Also mounted for pivotal movement on bracket 18 is a latch 36 which is pivotal about cross tie 24 and is provided with a notch 38. A generally L-shaped latch plate 40 extends between the two pivotal arms 28 (FIGS. 3 and 4) and is rigid with the latter.

A first coil spring 42 extends from latch arm 36 downwardly to a bolt 44. Bolt 44 is received in an opening in foot 26 and the length of the bolt is adjustable through wing nut 46. A second yieldable means in the form of coil springs 48 and 50 (FIG. 3) extends from arms 28 to bracket 18. Socket 30 has an open end 52 for receiving the end of a fishing rod 54 (FIG. 1).

OPERATION

The device 10 is used by first inserting stake 12 into the ground 16 sufficiently far to firmly hold device 10. The handle of rod 54 is inserted into the cylindrical socket member 30 in the manner illustrated in FIG. 1. The socket is pivoted upwardly until notch 38 of latch 36 engages the latch plate 40. Once in this position, spring 42 will hold the latch in engagement with the latch plate. When a fish bites on a line connected with rod 54, socket 30 will pivot downwardly as indicated by the arrow in FIG. 2. This downward movement causes cam 34 to rise pushing upwardly against latch 36 to disengage it from latch plate 40. As this disengagement occurs, springs 48 and 50 will exert a force on arms 28 in a generally upwardly direction to cause socket 30 to pivot upwardly as indicated by the arrow in FIG. 4. Once socket 30 has moved to its fully upright position, the tension on springs 48 and 50 will be substantially released so as not to continue to exert additional force on the line connected to rod 54.

It has been found that a paarticular advantage to the construction of a fishing rod holder according to the present invention is the positive release action provided by cam 34. Since the cam exerts an upward force on latch 36, a positive release mechanism is provided which is much more reliable than those devices which rely simply upon the downward pulling action of the rod holder itself to unlatch a lock. It will be appreciated that another advantage of the invention is the ability to adjust the tension on latch spring 42 by means of nut and bolt assembly 44. This makes the device usable with rods of different weight and sizes, different types of fish, and the fishing ability of the person utilizing the device.

I claim:

1. A fishing rod holder comprising:

stake means for insertion into the ground;

bracket means rigid with said stake and extending upwardly therefrom;

pivotal arm means coupled with said bracket means for pivotal movement relative thereto between a cocked position and a hook setting position;

socket means for receiving an end of said rod, said socket means being coupled with said arm means at a point spaced from the point of coupling of said arm means with said bracket means to effect generally upward movement of said socket means to set a fish hook depending from the rod when said arm means moves from the cocked to the hook setting position;

a latch plate rigidly mounted on said pivotal arm means and non-movable therewith;

a latch having a notch therein, said latch being pivotally coupled with said bracket means for pivotal movement between a latching position wherein the latch plate is engaged in said notch to hold said arm means in the cocked position and a release position wherein the notch is displaced from the latch plate;

camming means mounted on said socket means at a location to engage said latch and push same from the latching position to the release position by camming action when said socket means is pulled generally downwardly;

first yieldable means for biasing said latch toward the latching position; and second yieldable means for biasing said arm means toward the hook setting position to effect setting of the hook when said latch is moved to the release position by said camming means.

2. The invention of claim 1, wherein said socket means presents an elongated open-ended cylinder having an open end for receiving the rod.

3. The invention of claim 1, wherein said pivotal arm means comprises first and second arm brackets, said socket means being disposed between said brackets.

4. The invention of claim 3, wherein said second yieldable means comprises first and second coil springs coupled with said arm means at one end and with said bracket means at the opposite end.

5. The invention of claim 4, wherein is included a foot coupled with said bracket means and extending in the direction of said stake means, said foot mounting a bolt and nut assembly, said first yieldable means comprising a spring coupled with said latch at one end and said bolt at the other end, said bolt being movable relative to said foot to thereby adjust the tension on said first yieldable means.

6. The invention of claim 2, wherein said camming means comprises a cam element on said socket means adjacent an end thereof opposite said open end.

7. The invention of claim 1, wherein said camming means comprises a cam element having a curved surface acting against said latch by camming action to push same to the release position.

* * * * *